(12) United States Patent
Johnson

(10) Patent No.: US 7,987,134 B1
(45) Date of Patent: Jul. 26, 2011

(54) HYBRID AUCTIONS AND METHODS AND SYSTEMS FOR CONDUCTING SAME OVER A COMPUTER NETWORK

(75) Inventor: Richard C. Johnson, Cupertino, CA (US)

(73) Assignee: Oracle International Corporation, Redwood Shores, CA (US)

(*) Notice: Subject to any disclaimer, the term of this patent is extended or adjusted under 35 U.S.C. 154(b) by 2142 days.

(21) Appl. No.: 09/965,098

(22) Filed: Sep. 26, 2001

(51) Int. Cl.
*G06Q 40/00* (2006.01)
(52) U.S. Cl. ............ 705/37; 705/35; 705/1.1; 705/26.1; 709/203
(58) Field of Classification Search .................. 705/37, 705/35, 1, 7, 26, 38, 14; 709/203
See application file for complete search history.

(56) References Cited

U.S. PATENT DOCUMENTS

| | | | |
|---|---|---|---|
| 3,581,072 A | 5/1971 | Nymeyer | |
| 5,329,589 A | 7/1994 | Fraser et al. | |
| 5,794,219 A | 8/1998 | Brown | |
| 5,905,975 A | 5/1999 | Ausubel | |
| 6,012,045 A | 1/2000 | Barzilai et al. | |
| 6,243,691 B1 | 6/2001 | Fisher et al. | |
| 6,366,891 B1 | 4/2002 | Feinberg | |
| 6,449,601 B1 | 9/2002 | Friedland et al. | |
| 6,609,112 B1* | 8/2003 | Boarman et al. | 705/37 |
| 2002/0147675 A1* | 10/2002 | Das et al. | 705/37 |

OTHER PUBLICATIONS

Kevin A. McCabe; Stephen J. Rassenti; Vernon L. Smith, Designing call auction institutions: Is Double Dutch the Best?, Jan. 1992, The Economic Journal, vol. 102, pp. 9-23.*
Kevin McCabe; Stephen Rassenti; Vernon Smith; Designing auction institutions for exchange.;Sep. 1999, Institute of Industrial Engineers, Inc. (IIE); IEE Transactions, 31, 9, 803.*
Internet Auctions, USENIX Papers, *Internet Auctions*, Kumar, Manoj and Feldman, Stuart I., pp. 1-13; IBM Research Division, T.J. Watson Research Center, Yorktown Heights, NY 10598, http://ftp.sage.usenix.org/event/ec98/f...rs/kumar_auctions/kumar_html/kumar.htm.
C/Net news.com, http://www.news.com/, "AT&T sues eBay, PayPal over patent", Jan. 21, 2004.
International Search Report from corresponding International Application No. PCT/US02/30562, mailed Jul. 7, 2003 (3pgs).
International Preliminary Examination Report from corresponding International Application No. PCT/US02/30562, completed on Mar. 22, 2004 (4pgs).

* cited by examiner

*Primary Examiner* — Behrang Badii
(74) *Attorney, Agent, or Firm* — Kilpatrick Townsend & Stockton LLP

(57) ABSTRACT

A two phase auction for an item includes a first phase in which an asking price for the item decreases at predetermined intervals when the auction is a seller's auction and increases at predetermined intervals when the auction is a buyer's auction, and a second phase after the first phase wherein the asking price starts at a level equal to a first bid placed by a first bidder during the first phase and periodically increases when the auction is a seller's auction and decreases at predetermined intervals when the auction is a buyer's auction until no additional bids are received from the first bidder and/or additional bidders, the auctioned item being awarded to a last bidder in the second phase.

18 Claims, 7 Drawing Sheets

DUTCH SELLER'S AUCTION

ENGLISH SELLER'S AUCTION

HYBRID AUCTIONS AND METHODS AND SYSTEMS FOR CONDUCTING SAME OVER A COMPUTER NETWORK

BACKGROUND OF THE INVENTION

1. Field of the Invention

The present invention relates generally to auctions.

2. Description of the Related Art

Auctions, whether conducted online over the Internet or in person, have emerged as an increasingly popular forum for efficiently buying and selling goods and services. Two principal forms of auctions include the so-called Dutch auction and the so-called English auction. A Dutch seller's auction is illustrated in FIG. 1 whereas an English seller's auction is shown in FIG. 2. The phrase "seller's auction" means that one or more sellers are offering to sell an item (which may include goods, services or anything of value) to one or more buyers. The seller's objective is to maximize the price at which the item is sold. The phrase "buyer's auction", in contrast, refers to auctions sponsored by one or more buyers in which the buyers are offering to purchase an item from one or more sellers. The buyers' objective is to minimize the price to be paid for the item.

FIG. 1 is a graph of the seller's asking prices and bids from one of the buyers over time. As shown therein, a seed price is set by the seller, the seed price representing the initial asking price for the item to be auctioned. In a Dutch auction, the asking price decreases by a predetermined amount over time, starting from the seed price. Tied to a clock, the asking price decreases until one of the buyers stops the clock and bids at the then current asking price. In a Dutch seller's auction, the first buyer to bid at the current asking price is awarded the item. If the asking price falls below a predetermined secret reserve level set by the seller, the auction may be cancelled.

Turning now to FIG. 2, an English seller's auction operates in the reverse manner. As shown, a seed price is set by the seller. In English seller's auctions, the seed price (initial asking price) may be set below the seller's reserve price, with the expectation that the bidding momentum will carry the price above the reserve price during the course of the auction. In an English seller's auction, buyers compete with one another and bid the price of the auctioned item ever higher until no other buyers are willing to bid higher than the last bid placed. The highest and last bid placed wins. That is, the buyer having placed the last bid is awarded the item that is the subject of the auction and must pay the seller the amount of the winning bid.

Whatever the format, all auctions are concerned with securing the maximum price for the seller and the minimum price for the buyer, although both objectives may not be met in the same auction. However, when the buyer having placed the winning bid, whether in a Dutch or English auction, later believes that he or she may have overpaid for the item, there is an increased risk of default on the part of the buyer, especially in a decreasing market for such goods. This is inefficient and vastly increases the seller's transactional costs for selling the item. Similar problems exist with buyer's auctions, as the seller may default and refuse to honor its obligation to sell the item at a price equal to the seller's winning bid (as may occur in a rising market for such goods). Rules of given auctions are often adjusted to address these problems, but no single solution has yet emerged that provides both buyer and seller with an optimum forum for buying and selling goods and services.

SUMMARY OF THE INVENTION

It is, therefore, an object of the present invention to provide improved auctions, both online and in person. It is another object of the present invention to reduce instances of default by both the buyer and seller by insuring that the price ultimately arrived at for the subject of the auction is perceived to be close to the item's true or perceived market value.

A method of conducting an auction for an item, according to an embodiment of the present invention, may include steps of setting a current asking price for the item; posting the current asking price and enabling bidding at the current asking price; periodically decreasing and posting the current asking price until a first bid is received from a first bidder at the then current asking price, and awarding the item to the first bidder at the then current asking price unless, after the first bid is received, at least one additional bidder bids higher than the first bid within a predetermined time interval after the first bid is received.

The method may also provide for setting a reserve price for the item, the reserve price being that price below which the item will not be sold, and stopping the auction if the periodic decreasing step decreases the current asking price to a level that is at or below the reserve price and no bid is received at the reserve price. The decreasing step may be carried out at a predetermined regular time interval. The posting step may include a step of causing the current asking price to be displayed on one or more remote computing device coupled to a network (such as the Internet, for example). When the additional bidder(s) bids higher than the first bid, the method may further include steps of accepting increasingly higher successive bids from the first bidder and/or the additional bidder(s), and awarding the item to the highest bidder among the first bidder and the additional bidder(s). The accepting step may accept each one of the increasingly higher successive bids if timely received (e.g., received within a predetermined time interval). The item may include, for example, a contract, goods, a service, real estate, a legal right or anything of value.

According to the present invention, an auction for an item, may include a first phase in which an asking price for the item decreases at predetermined intervals when the auction is a seller's auction and increases at predetermined intervals when the auction is a buyer's auction, and a second phase after the first phase in which the asking price starts at a level equal to a first bid placed by a first bidder during the first phase and periodically increases when the auction is a seller's auction and decreases at predetermined intervals when the auction is a buyer's auction until no additional bids are received from the first bidder and/or additional bidders, the auctioned item being awarded to a last bidder in the second phase.

When the auction is a seller's auction, a reserve price for the item may be set prior to the first phase, the reserve price being that price below which the item will not be sold, the auction being halted if the asking price during the first phase decreases to a level that is below the reserve price.

According to another embodiment thereof, the present invention is also a computer system configured for managing an auction for an item over a computer network, comprising at least one processor; at least one data storage device; a plurality of processes spawned by the at least one processor, the processes including processing logic for setting a current asking price for the item; posting the current asking price and enabling bidding at the current asking price; periodically decreasing and posting the current asking price until a first bid is received from a first bidder over the network at the then current asking price, and awarding the item to the first bidder at the then current asking price unless, after the first bid is received, at least one additional bidder bids higher than the first bid over the network within a predetermined time interval after the first bid is received.

According to still another embodiment thereof, the present invention is a machine-readable medium having data stored thereon representing sequences of instructions which, when executed by computing device, causes the computing device to manage an auction for an item over a computer network by performing the steps of setting a current asking price for the item; posting the current asking price and enabling bidding at the current asking price; periodically decreasing and posting the current asking price until a first bid is received from a first bidder at the then current asking price, and awarding the item to the first bidder at the then current asking price unless, after the first bid is received, at least one additional bidder bids higher than the first bid within a predetermined time interval after the first bid is received.

The present invention is also a method of enabling a plurality of users to participate in an online auction for an item conducted by a remote server, the auction including a first phase followed by a second phase, the method including the steps of, during the first phase, receiving a succession of decreasing first asking prices for the item from the remote server, and optionally sending a first bid on the item at a last received first asking price to the remote server, and during the second phase, receiving at least one successive increased second asking price from the remote server, the increased second asking price being higher than the last received first asking price received during the first phase, and optionally sending at least one second bid for the item at the increased second asking price to the remote server, the item ultimately being awarded to the user of the plurality of users having placed the last second bid.

According to the present invention, a computer system configured to enable one of a plurality of users to participate in an online auction for an item conducted by a remote server, the auction including a first phase followed by a second phase, includes at least one processor; at least one data storage device; a plurality of processes spawned by the at least one processor, the processes including processing logic for, during the first phase, receiving a succession of decreasing first asking prices for the item from the remote server, and optionally sending a first bid on the item at a last received first asking price to the remote server, and during the second phase, receiving at least one successive increased second asking price from the remote server, the increased second asking price being higher than the last received first asking price received during the first phase, and optionally sending at least one second bid for the item at the increased second asking price to the remote server, the item ultimately being awarded to a user of the plurality of users having placed a last second bid.

According to still another embodiment thereof, a machine-readable medium having data stored thereon representing sequences of instructions which, when executed by computing device, causes the computing device to enable one of a plurality of users to participate in an online auction for an item conducted by a remote server, the auction including a first phase followed by a second phase by performing the steps of, during the first phase, receiving a succession of decreasing first asking prices for the item from the remote server, and optionally sending a first bid on the item at a last received first asking price to the remote server, and during the second phase, receiving at least one successive increased second asking price from the remote server, the increased second asking price being higher than the last received first asking price received during the first phase, and optionally sending at least one second bid for the item at the increased second asking price to the remote server, the item ultimately being awarded to a user of the plurality of users having placed a last second bid.

In the case of a hybrid buyer's auction, the present invention is also a method of conducting an auction for an item, comprising the steps of setting a current offering price for the item; posting the current offering price and enabling bidding at the current offering price; periodically increasing and posting the current offering price until a first bid is received from a first bidder at the then current offering price, and awarding the item to the first bidder at the then current offering price unless, after the first bid is received, at least one additional bidder bids lower than the first bid within a predetermined time interval after the first bid is received.

The increasing step may be carried out at a predetermined regular time interval. The posting step may include a step of causing the current offering price to be displayed on at least one remote computing device coupled to a network. When the at least one additional bidder bids lower than the first bid, the method may further include the steps of accepting increasingly lower successive bids from the first bidder and/or the additional bidder(s), and awarding the item to the lowest bidder among the first bidder and the additional bidder(s). The accepting step may accept each one of the increasingly lower successive bids if timely received. The item may include, for example, a contract, goods, a service, real estate and a legal right or anything of value.

The present invention is also a computer system configured for managing an auction for an item over a computer network, comprising at least one processor; at least one data storage device; a plurality of processes spawned by the at least one processor, the processes including processing logic for setting a current offering price for the item; posting the current offering price and enabling bidding at the current offering price; periodically increasing and posting the current offering price until a first bid is received from a first bidder over the network at the then current offering price, and awarding the item to the first bidder at the then current offering price unless, after the first bid is received, at least one additional bidder bids lower than the first bid within a predetermined time interval after the first bid is received.

The present invention, according to another embodiment thereof, is a machine-readable medium having data stored thereon representing sequences of instructions which, when executed by computing device, causes the computing device to manage an auction for an item over a computer network by performing the steps of setting a current offering price for the item; posting the current offering price and enabling bidding at the current offering price; periodically increasing and posting the current offering price until a first bid is received from a first bidder at the then current offering price, and awarding the item to the first bidder at the then current offering price unless, after the first bid is received, at least one additional bidder bids lower than the first bid within a predetermined time interval after the first bid is received.

According to yet another embodiment thereof, the present invention is a method of enabling a plurality of users to participate in an online auction for an item conducted by a remote server, the auction including a first phase followed by a second phase, the method comprising the steps of, during the first phase, receiving a succession of increasing first offering prices for the item from the remote server, and optionally sending a first bid on the item at the last received first offering price to the remote server, and during the second phase, receiving at least one successive decreased second offering price from the remote server, the decreased second offering price being lower than the last received first offering price received during the first phase, and optionally sending at least one second bid for the item at the decreased second offering price to the remote server, the item ultimately being awarded to a user of the plurality of users having placed the last second bid.

The present invention is also a computer system configured to enable one of a plurality of users to participate in an online auction for an item conducted by a remote server, the auction including a first phase followed by a second phase, comprising at least one processor; at least one data storage device; a plurality of processes spawned by the at least one processor, the processes including processing logic for, during the first phase, receiving a succession of increasing first offering prices for the item from the remote server, and optionally sending a first bid on the item at a last received first offering price to the remote server, and during the second phase, receiving at least one successive decreased second offering price from the remote server, the decreased second offering price being lower than the last received first offering price received during the first phase, and optionally sending at least one second bid for the item at the decreased second offering price to the remote server, the item ultimately being awarded to the user of the plurality of users having placed the last second bid.

According to another embodiment thereof, the present invention is also a machine-readable medium having data stored thereon representing sequences of instructions which, when executed by computing device, causes the computing device to enable one of a plurality of users to participate in an online auction for an item conducted by a remote server, the auction including a first phase followed by a second phase by performing the steps of, during the first phase, receiving a succession of increasing first offering prices for the item from the remote server, and optionally sending a first bid on the item at a last received first offering price to the remote server, and during the second phase, receiving at least one successive decreased second offering price from the remote server, the decreased second offering price being lower than the last received first offering price received during the first phase, and optionally sending at least one second bid for the item at the decreased second offering price to the remote server, the item ultimately being awarded to the user of the plurality of users having placed the last second bid.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE INVENTION

Functional Description

Figure 3:
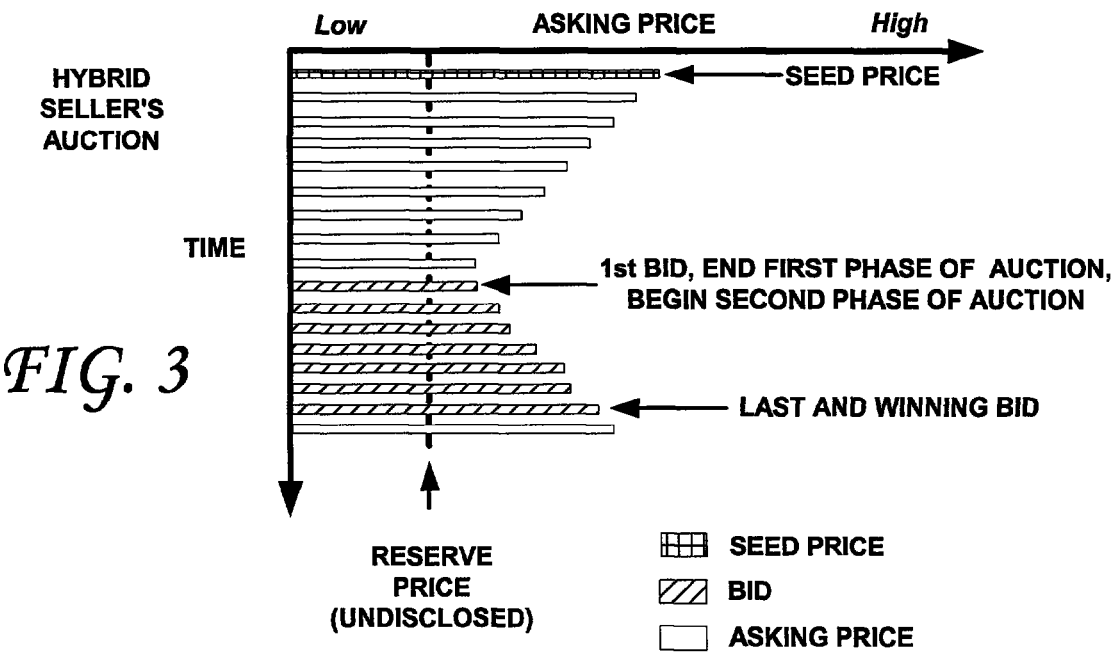
FIG. 3 shows a hybrid seller's auction, according to an embodiment of the present invention.

FIG. 3 shows a hybrid seller's auction, according to an embodiment of the present invention. In FIG. 3, the abscissa of the graph represents the seller's asking price whereas the ordinate thereof represents time. A hybrid seller's auction, according to the present invention, includes two distinct phases. As shown therein, a seed price (the initial asking price) may be set by the seller prior to the start of the auction. The initial asking price for the auctioned item may then be set to the seed price. The first phase of the hybrid auction begins by posting the current asking price to each of the plurality auction participants (potential buyers, in this case). Such a posting step may include, for example, announcing the current asking price and/or causing the current asking price to be provided (e.g., displayed) to each of the hybrid auction participants over a computer network, such as the Internet, for example. Bidding may then be enabled at the current asking price. During the first phase of the present hybrid auction, the asking price for the auctioned item may start at a high level and may periodically decrease (in preset increments and/or at regular time intervals, for example). The asking price, therefore, may be periodically decreased and posted to each of the plurality of auction participants until a first bid from a bidder (a potential buyer) is received at the then current asking price. In the exemplary hybrid auction shown in FIG. 3, after posting an asking price equal to the seed price and finding no willing buyers at this price, the asking price for the auctioned item is decreased eight times, until a first bid is received at the then current asking price. If no first bid is received and the asking price falls below the reserve price for the item (the reserve price being that price below which the seller will not sell the item), the present hybrid auction may be halted and further bids may not be accepted.

According to the present invention, the receipt of a first bid marks the end of the first phase of the present hybrid auction and marks the beginning of the second phase thereof. During the second phase of the present hybrid auction, the item to be auctioned may or may not be awarded to the first bidder (the last—and only—bidder during the first phase of the auction) at the then current asking price. Indeed, if no additional bidders bid up the price of the item during the second phase, the auctioned item is awarded to the first bidder that bid during the first phase of the present hybrid auction. If, however, one or more additional bidders place bids that are higher (for example, by a set amount) than the first bid, then the first bidder is not awarded the item unless the first bidder him or herself rejoins the auction and places a winning bid. A winning bid, in this case is a bid that is higher than the last bid placed during the second phase of the hybrid auction. If the first bidder does not rejoin the auction by placing a bid that is higher than the last bid placed, the auctioned item is awarded to that bidder having placed the highest bid during the second phase thereof. Advantageously, the present hybrid auction is resolved quickly and efficiently achieves the auctioned item's true or perceived market value.

Figure 4:
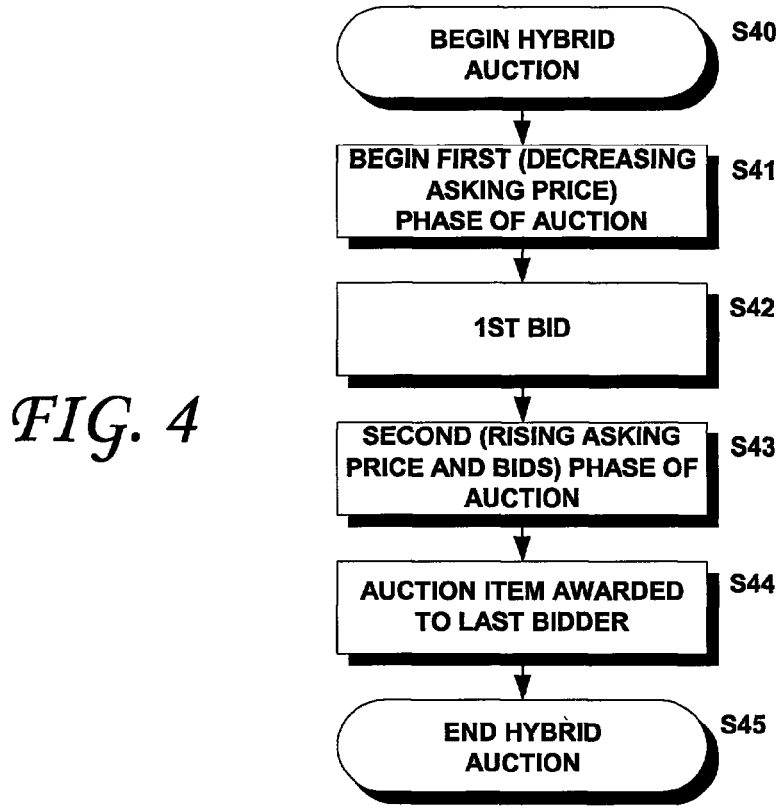
FIG. 4 is a flowchart of a hybrid seller's auction, according to an embodiment of the present invention.

As outlined in FIG. 4, the hybrid auction according to the present invention, begins at S40, and includes a first phase S41 in which the asking price may periodically decrease until a first bidder places a first bid S42 at the then current asking price. The second phase S43 then begins in which the bidding for the auctioned item starts at the level of the first bid and increases as additional bidders drive up the price of the item by placing progressively higher bids until a last bid is received, as shown at S44 and the auctioned item awarded to the highest bidder. The method ends at S45. The timing of the decreasing of the asking price and the posting thereof during the first phase and the timing of the increasing bids during the second phase may be freely set, according to the particular circumstances of the auction. For example, the decreasing of the asking price of the auctioned item may be carried out at a predetermined regular time interval, whereas the rhythm of the increases of the bids during the second phase may be set by the seller or determined entirely by the timing with which the buyers place their competing increasing bids, subject to constraints (time limits, for example) set by the seller or auctioneer. Each of the asking prices and the bids may be posted (e.g., caused to be displayed on the participants' computing device, provided orally to the participants, etc.). Appropriate time intervals and/or limits may be freely set for accepting the bids and determining which of the placed bids is the last bid placed. The hybrid auction according to the present invention may auction goods, services, contracts, real estate, legal rights (e.g., the right to do something or to prevent others from doing something) or anything of value.

The present two-phase hybrid auction, contrary to conventional Dutch and/or English auctions, forces the buyer's first bid in the first phase into some real approximation of the bidder's (and potential bidder's) view of the "true" or perceived fair market value price of the item to be auctioned, rather than allowing the bidder the usual practice in English auctions of issuing bids well below the (usually hidden) reserve price. One advantage to the bidder of the present hybrid auction is that the end of the first phase (which may conclude very rapidly) automatically becomes the start of the second phase. Indeed, the closer the first bid in the first phase comes to the "true" or perceived fair market value of the item; the better chance the first (and hence final) bidder has of encountering no competition during the second phase of the present hybrid auction. Still, if one or more of the other auction participants believe that the first bidder in the first phase is about to obtain the auctioned goods or services at too low a price, they will step in, place higher bids (at preset increments, for example) and drive the price of the auctioned item away from the seller's reserve price. Thus, the sponsor of the auction (which may or may not be the seller of the auctioned item) achieves its goal of maximizing the price obtained for the item during the auction process.

Figure 5:
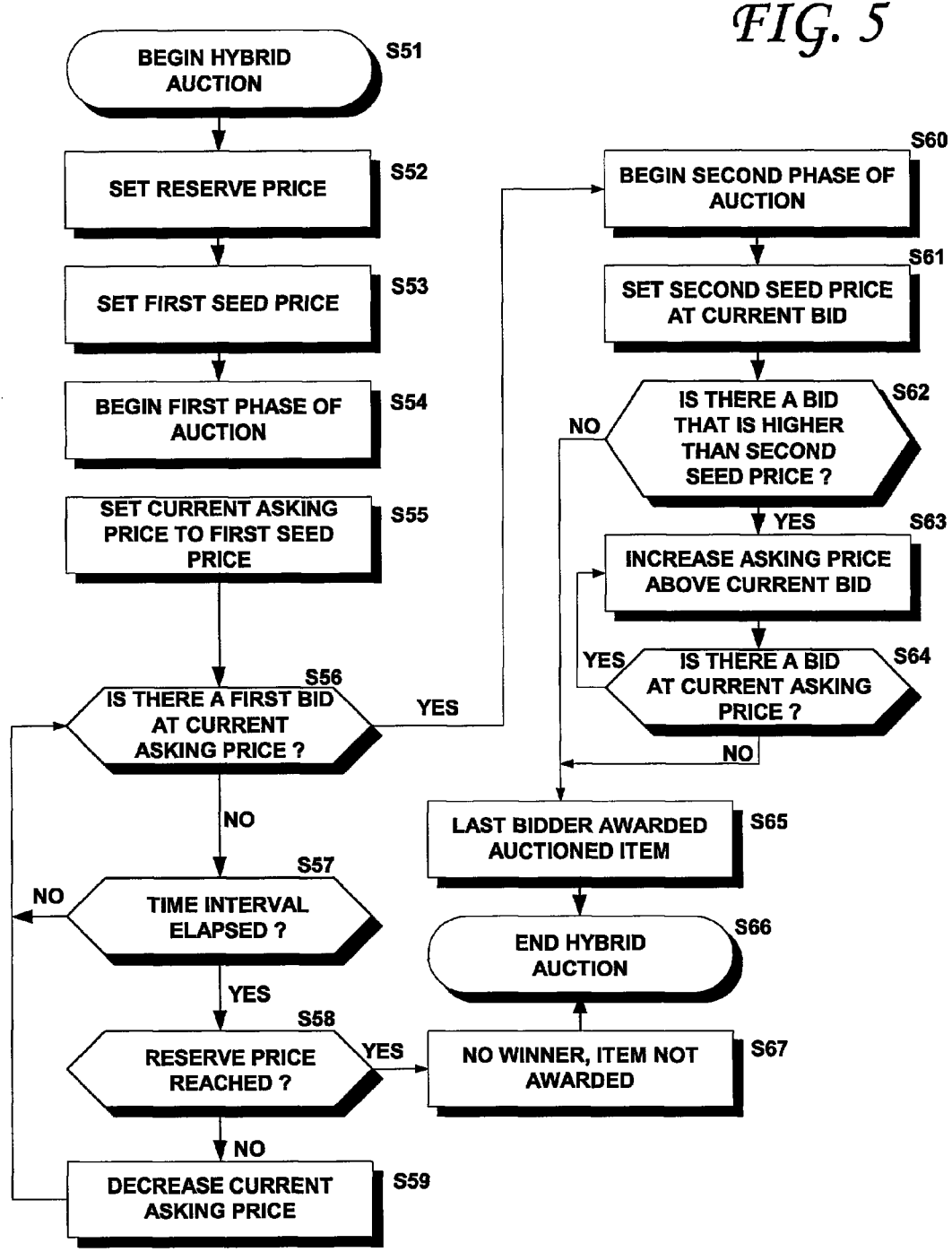
FIG. 5 is a detailed flowchart of a hybrid seller's auction, according to an embodiment of the present invention.

FIG. 5 is a detailed flowchart of a hybrid seller's auction, according to an embodiment of the present invention. As shown therein, the hybrid auction begins at S51, whereupon the seller may set a reserve price and a seed price (initial asking price) for the auctioned item, as shown at S52 and S53, respectively. The first phase of the auction begins at S54 and the current asking price is set to the first seed price, as shown at S55. In steps S56 and S57, it is recursively determined whether a first bid has been received at the current asking price before a predetermined time interval (may be seconds or days, for example) has elapsed. If the time interval referenced at S57 has elapsed, the current asking price is compared to the reserve price at S58. If the reserve price has been reached and/or passed, the auctioned item may not be awarded as shown at S67 and the present hybrid auction may be halted at S66. That the reserve price has been reached or passed and that the hybrid auction has been halted may then be posted to each of the auction participants.

If, however, the reserve price has not been reached or passed (the asking price has reached a level below the reserve price), the current asking price may be periodically decreased by a predetermined amount, as shown at S59, until a first bid is received at the current asking price (YES branch of S56). The predetermined amount may be preset by the seller and/or may be adaptive depending, for example, upon the nature of the goods (durable or perishable, for example), the motivation of the seller to make the sale or upon most any other factor. The receiving of a first bid during the first phase marks then end of the first phase and the beginning of the second phase of the present hybrid auction, as shown at S60. The amount of the first bid then becomes the second seed price that is used during the second phase of the hybrid auction, as shown at S61. In step S62, it is determined whether any additional bidders have placed a bid (or bids) that is higher than the second seed price. It is likely that no additional bidders will place a competing bid at this juncture if they believe that the first bid is higher than or closely approximates the auctioned item's "true" price or perceived market value. If, however, the other auction participants deem that the first bidder has obtained too great a bargain, they are likely to place competing (higher) additional bids during the second phase of the present hybrid auction. If no other auction participant places a bid during the second phase of the hybrid auction, the item is awarded to the last bidder at S65, which in this case, is the first and only bidder, both in the first phase and in the entire auction. The present auction then ends at S66. If, however, one or more of the auction participants joins in the auction and places a bid that is higher than the second seed price (YES branch of S62), the asking price is increased above the current bid, as shown at S63 and additional competing (higher) bids may be accepted, if timely received. In step S64, it is determined whether there is a bid at the current (increased) asking price from either the original first bidder of the first phase or any of the other auction participants. If yes, the asking price is again increased and the process repeated until no further bids are received at the current asking price, whereupon, after a suitable time interval, the auctioned item may be awarded to the last bidder as shown at S65 and the present hybrid auction ended at step S66.

Figure 6:
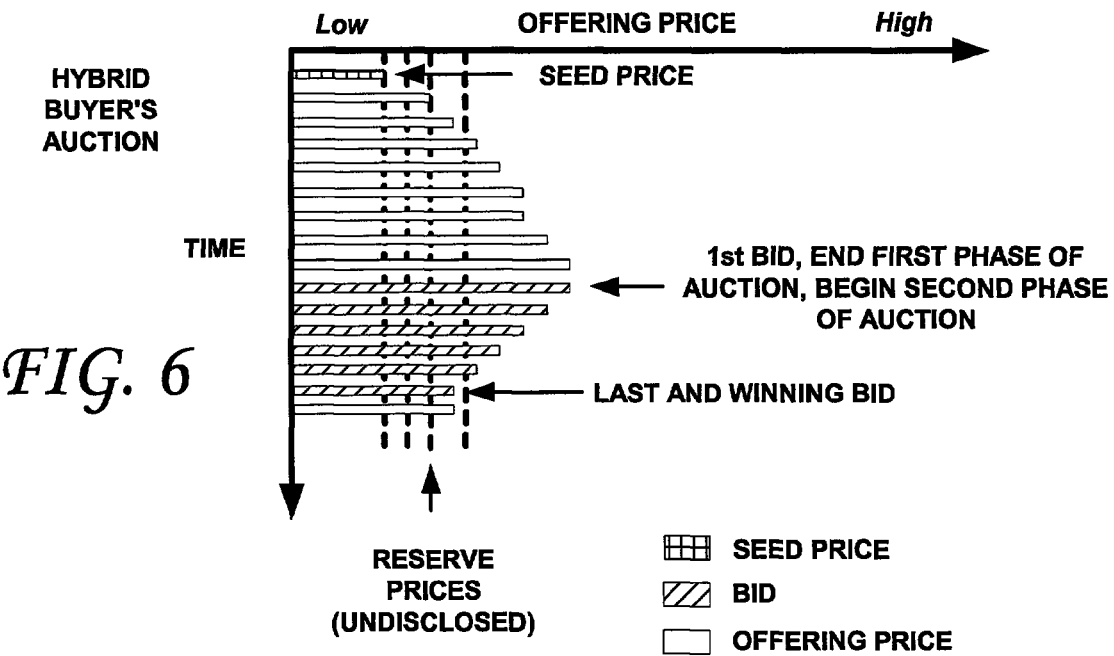
FIG. 6 shows a hybrid buyer's auction, according to an embodiment of the present invention.

The present invention is also advantageously applicable to buyer's auctions where a buyer offers to purchase an item from one or more sellers. In such an auction, therefore, a plurality of sellers compete to provide an item to one or more buyers. In traditional buyer's auctions, a buyer offers to purchase goods or services at progressively higher offering prices until one or more sellers accepts the buyer's offer and sells or agrees to sell the item to the buyer at the current offering price. FIG. 6 shows a hybrid buyer's auction, according to an embodiment of the present invention. As shown therein, the buyer may set a seed price, which then becomes the initial offering price for the auctioned item. As with seller's auctions, each seller may set their own reserve price below which they will not provide the auctioned item. These reserve prices, however, are not effective to halt the present hybrid auction (unless all reserve prices have been passed and no further sellers remain in the auction), but serve only as lower thresholds below which each seller may have decided not to accept any offers to buy from the buyer or buyers.

If, during a first phase of the present hybrid buyer's auction, the buyer finds no willing sellers at the current seed price, the offering price may be periodically increased until a first bid is received from one of the sellers to provide the item at the then current offering price. The receipt of the first bid from a first bidder (a seller, in this case) marks the end of the first phase and the beginning of the second phase of the present hybrid buyer's auction. In the second phase, additional bidders and/or the original bidder compete against one another by placing increasingly lower bids until a last bid is received (i.e., until no other sellers are willing to provide the item at the then current offering price). The last bidder is then the winner of the auction and is awarded right and obligation to provide the auctioned item to the buyer or buyers for an amount equal to the last bid. An advantage of this embodiment is that if the first bidder is about to obtain the auctioned goods or services at too low a price, the other participants (sellers) have the opportunity to rejoin the auction and bid down (in preset increments, for example) the offering price, to the buyer's ultimate benefit.

Figure 7:
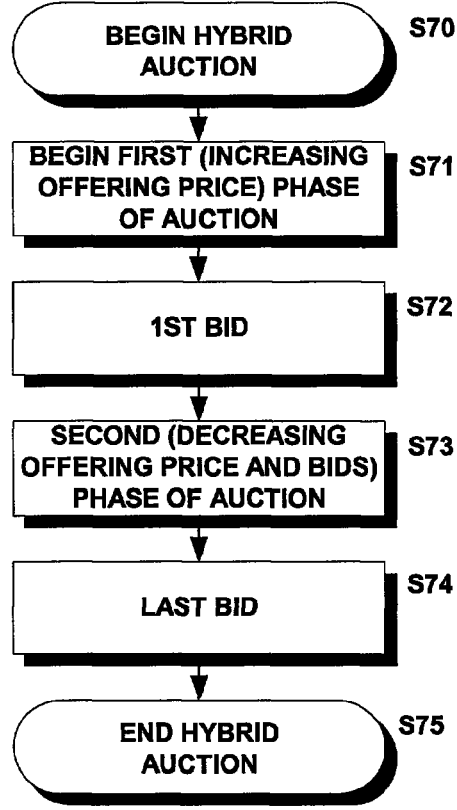
FIG. 7 is a flowchart of a hybrid buyer's auction, according to an embodiment of the present invention.

This process is outlined in FIG. 7, which is a flowchart of a hybrid buyer's auction, according to an embodiment of the present invention. As shown therein, step S70 begins the present buyer's hybrid auction and the first phase thereof in which the offering price for the auctioned item increases, as shown at S71. A first bid from one of the sellers at S72 ends the first phase of the present hybrid buyer's auction and begins the second phase thereof in which the additional bidding sellers compete against one another to provide the auctioned item, at progressively lower prices, as shown at S73. After determining that the last bid received was indeed the final bid (such as, for example, waiting for the expiration of a predetermined period of time without receiving additional bids) in S74, the present hybrid auction ends at S75 and the right and obligation to sell the auctioned item at an amount equal to the last bid is awarded to the last additional bidder during the second phase of the hybrid buyer's auction.

Figure 8:
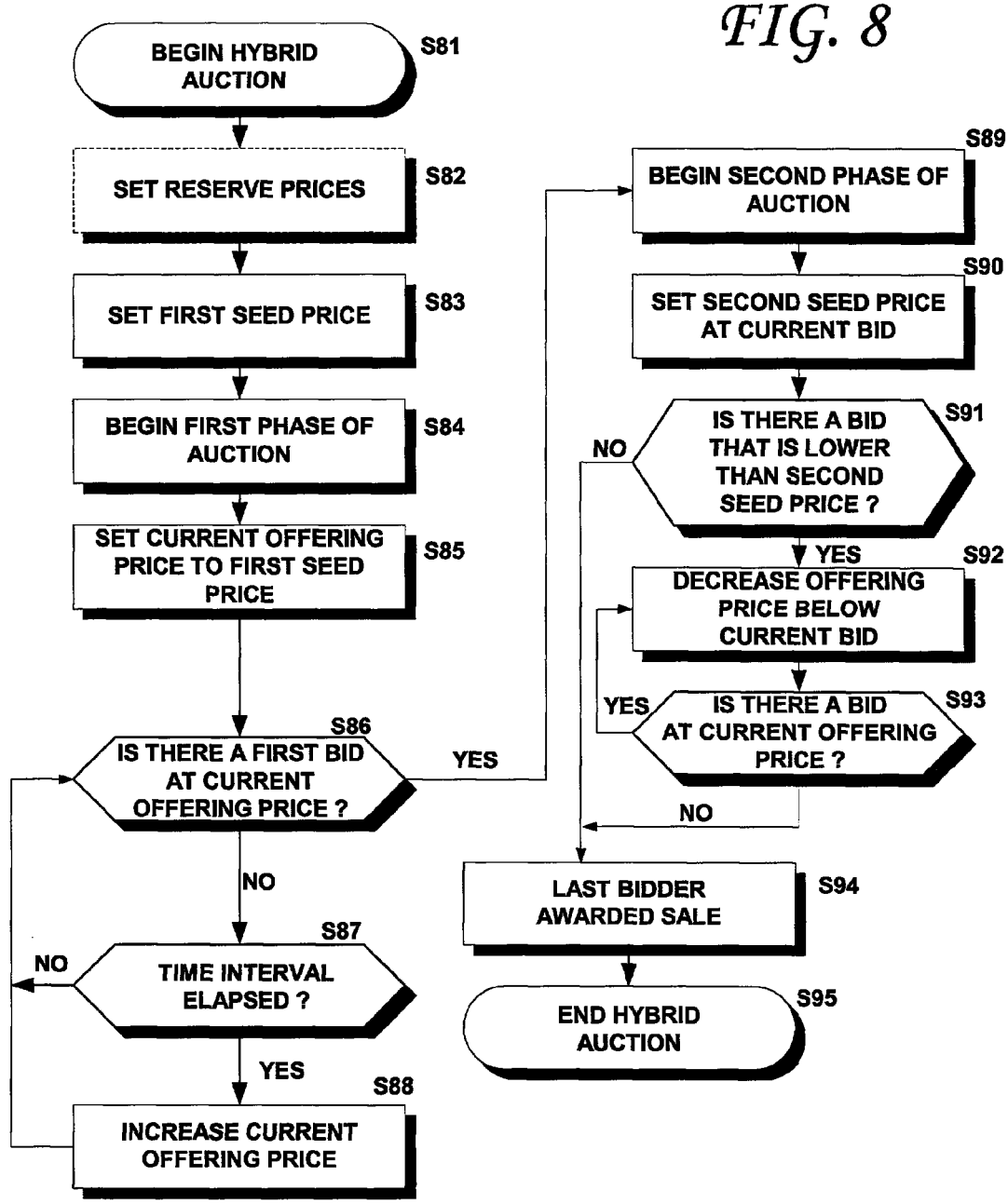
FIG. 8 is a detailed flowchart of a hybrid buyer's auction, according to an embodiment of the present invention.

FIG. 8 is a detailed flowchart of a hybrid buyer's auction, according to an embodiment of the present invention. As shown therein, the present hybrid buyer's auction begins at S81. Each of the auction participants (in this case, sellers) may have previously set their own reserve price, as shown at optional S82. A first seed price may be set at S83, which may (but need not) be substantially below any of the sellers' own reserve prices, a fact which may be unknown to the buyers. At S84, the first phase of the present hybrid buyer auction begins at S84. This is accomplished by setting the current offering price to the first seed price and accepting first bids from the auction participants at the current offering price. At S86, it is determined whether any of the auction participants have placed a first bid to provide the buyer or buyers with the auctioned item at the current offering price. If not, it is determined in step S87 whether a predetermined time interval (ranging, for example, from a few seconds to a few days) has elapsed. The current offering price may be maintained unchanged until the predetermined time interval of S87 has indeed elapsed. After the predetermined time interval of S87 has elapsed, the current offering price may be increased, as noted at S88 and as graphically shown in FIG. 6. The method may then revert to step S86, periodically increasing the offering price until a first bidder places a first bet at the then current offering price (YES branch of step S86). This event marks the end of the first phase and the beginning of the second phase of the present hybrid buyer's auction, as shown at S89. The second seed price (initial offering price) for the second phase is then set at the first bid placed during the first phase, as shown at S90. Step S91 calls for a determination whether any of the auction participants (sellers, in this case) have placed a bid that is lower than the second seed price. If not, the sale is awarded to the first bidder in the first phase (who is the last participant to bid), as shown at S94, whereupon the auction ends at S95. If one of the auction participants has indeed placed an additional bid during the second phase (YES branch of S91), the offering price may be decreased below the current bid as shown at S92 and a determination at S93 may again be made whether any auction participants have placed a (lower competitive) additional bid to sell the auctioned item at the price offered by the buyer. If yes, the offering price may again be decreased and the determination again made. When no further auction participants are willing to place an additional bid (NO branch of S93), the sale may be awarded to the last bidder (S94) and the auction ends at S95. One or more of the auction participants may drop out during the second phase, as the offering price dips below their respective hidden reserve prices.

Figure 9:
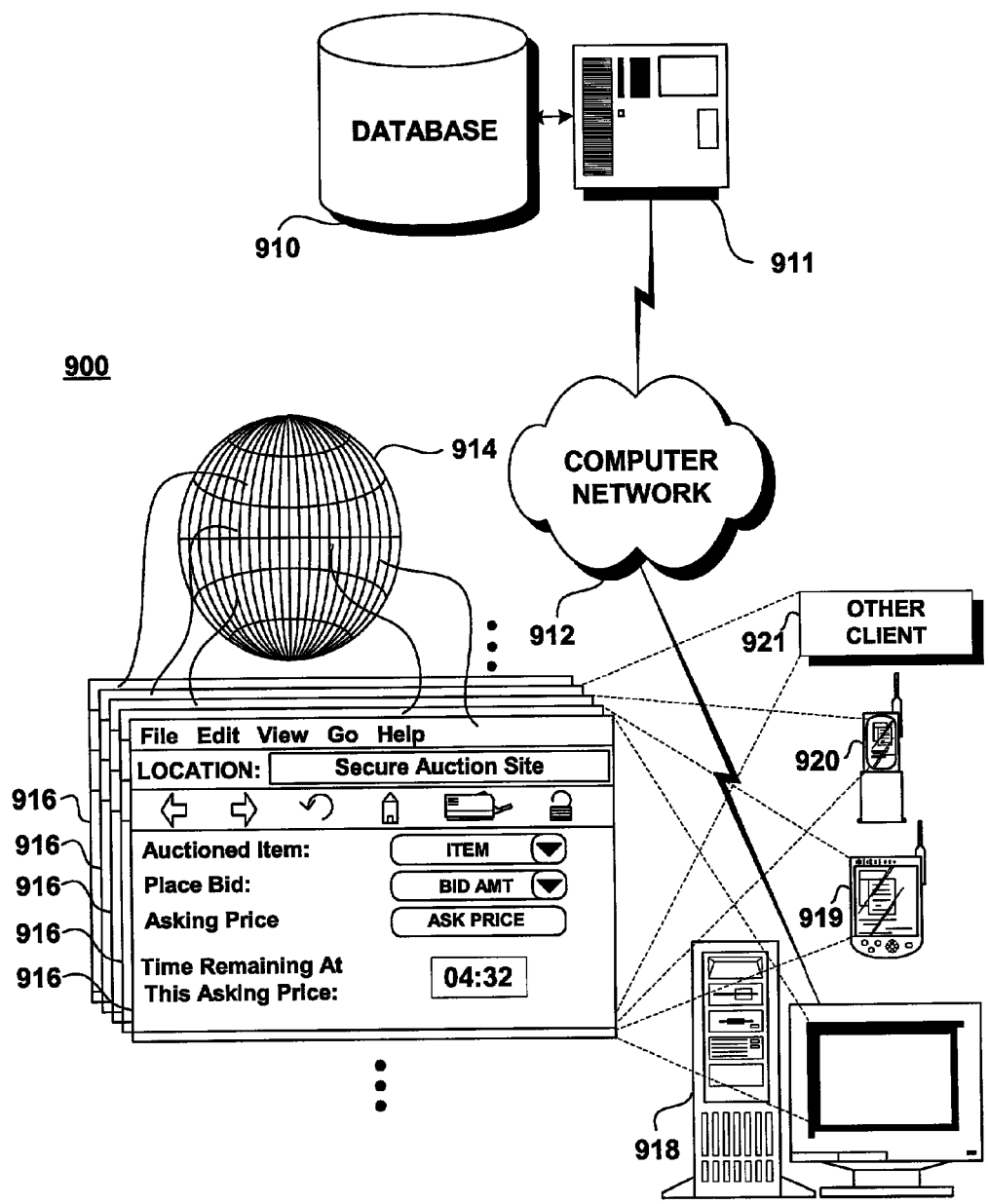
FIG. 9 shows a networked system suitable for practicing the present invention.
Figure 10:
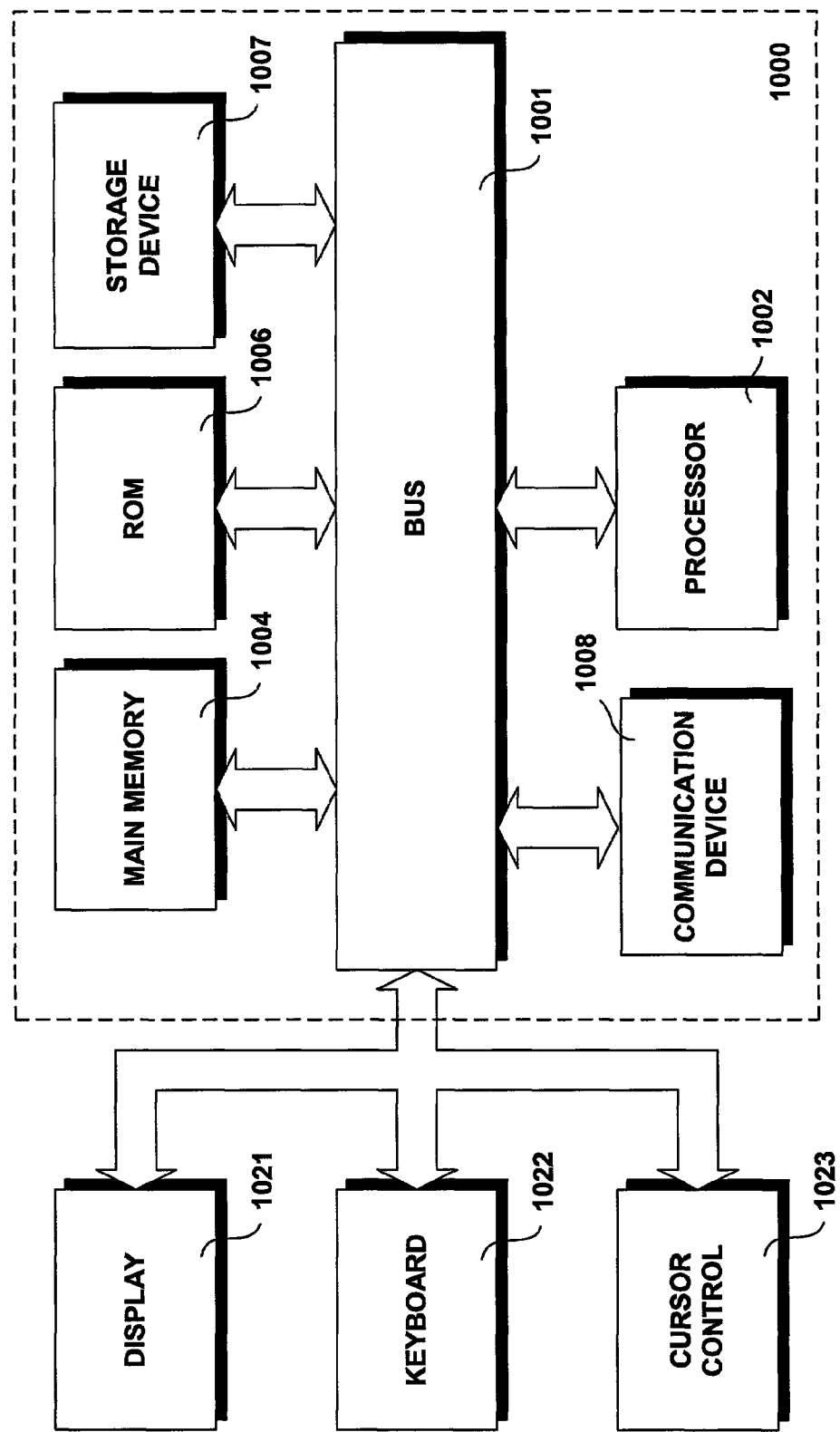
FIG. 10 is a diagram of a computing device with which the present invention may be practiced.

The present inventions may be practiced in person or online over a computer network, such as the Internet. FIG. 9 shows a system with which the present inventions may be practiced. As shown therein, the system 900 includes a computer network 912, a database 910 that is accessible via a server 911 coupled to the network 112 and one or more computers 918, personal Digital Assistants (PDAs) 919, World Wide Web (hereafter, Web) enabled mobile telephones 920 and/or other so-called thin clients 921 capable of accessing the network 912 and of running some version of a Web browser software 916 or some other suitable interface. According to the present inventions, all of the participants in the present hybrid auction may be loosely coupled to the server 911 through the computer network 912. The computer network 912 may include the Internet, for example, and/or other communication infrastructure. Indeed, the terms Internet and computer network are used interchangeably herein, and are intended to cover the Internet as it exists as of the time of this writing, and also any other communication infrastructure (public or private) for computers and/or other network devices yet to be developed. Security may be assured by suitable encryption of all communications to and from the server 911 and the thin clients (users, participants, bidders) 918, 919, 920 and/or 921 and/or by creating secure Virtual Private Networks (for example) or by other means known to those of skill in this art, such as a Secure Socket Layer (SSL). As shown in FIG. 10, each participant in the auction throughout the world 914 may view, on the browser 916 (or other suitable interface), the current status of the auction, the current offering and/or asking price, the last bid and be given the opportunity to place a bid for the auctioned item through suitable input means. Therefore, with the aid of a personal computer 918, network computer, Internet-enabled personal digital assistant 919, Web enabled mobile telephone 920 or any other device any device 921 equipped with a modem or other network access device allowing remote access to the network 912 or other Internet-enabled appliance, all participants in the auction may asynchronously send bids to the server 911. According to the present invention, the database 910 may store and provide the server 911 with access to all of the information (description of items, time of the auction, preset reserve prices, list of participants, etc.) that may be necessary to conduct one or a plurality of hybrid auctions according to the present invention.

Hardware Description

Figure 1:
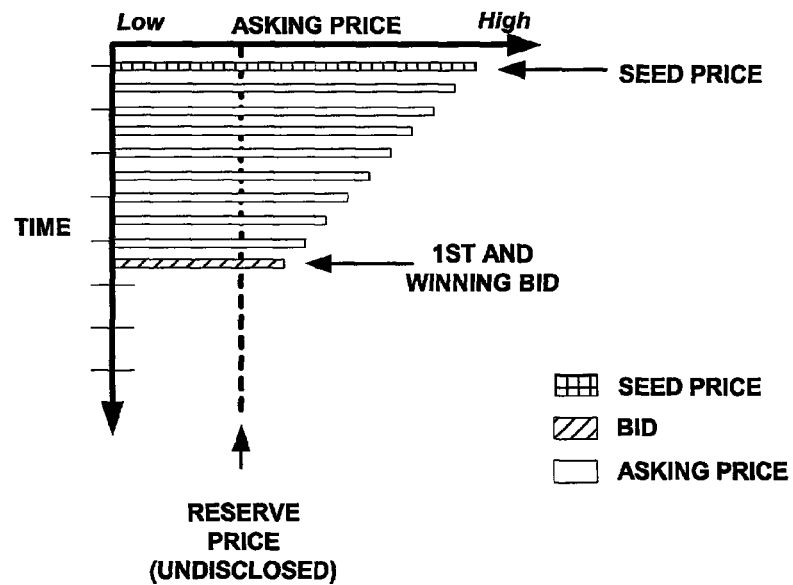
FIG. 1 illustrates a seller's Dutch auction.
Figure 2:
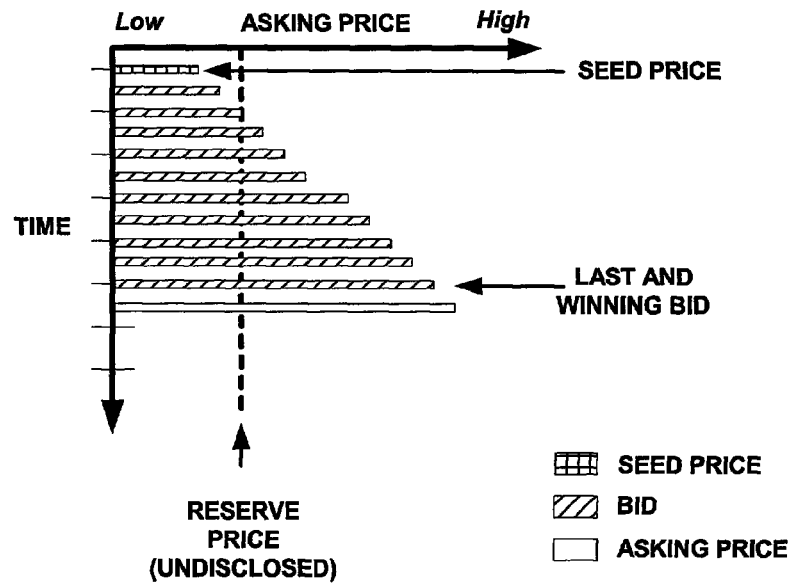
FIG. 2 illustrates a seller's English auction.

FIG. 10 illustrates a block diagram of a computing device 1000 with which an embodiment of the present invention may be implemented. Examples of such computing devices are shown at reference numeral 918 in FIG. 10. Computing device 1000 includes a bus 1001 or other communication mechanism for communicating information, and a processor 1002 coupled with bus 1001 for processing information. Computing device 1000 further comprises a random access memory (RAM) or other dynamic storage device 1004 (referred to as main memory), coupled to bus 1001 for storing information and instructions to be executed by processor 1002. Main memory 1004 also may be used for storing temporary variables or other intermediate information during execution of instructions by processor 1002. Computing device 1000 may also include a read only memory (ROM) and/or other static storage device 1006 coupled to bus 1001 for storing static information and instructions for processor 1002. A data storage device 1007, such as a magnetic disk or optical disk, may be coupled to bus 1001 for storing information and instructions. A communication device 1008, such as a modem or network (such as Ethernet, for example) card is also coupled to the bus 1001 to provide access to a network, such as shown at 112 in FIG. 1.

The computing device 1000 may also be coupled via bus 1001 to a display device 1021, such as a cathode ray tube (CRT), for displaying information to a computer user. An alphanumeric input device 1022, including alphanumeric and other keys, is typically coupled to bus 1001 for communicating information and command selections to processor 1002. Another type of user input device may be the user's own voice or cursor control 1023, such as a mouse, a trackball, or cursor direction keys for communicating direction information and command selections to processor 1002 and for controlling cursor movement on display 1021.

The present invention is related to the use of computing device 1000 to participate in or manage hybrid auctions as described herein. According to one embodiment, the processing may be carried out by one or more computing devices 1000 in response to processor(s) 1002 executing sequences of instructions contained in memory 1004. Such instructions may be read into memory 1004 from another computer-readable medium, such as data storage device 1007 and/or from a remotely located server. Execution of the sequences of instructions contained in memory 1004 causes processor(s) 1002 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method for conducting an auction for an item at a network-based auction location accessible to auction participants, the method comprising:

receiving, at one or more computer systems configured to manage the auction, one or more rules defining when the right and obligation to purchase the item will be awarded, the one or more rules specifying a first phase for the auction the first phase during which the right and obligation to purchase the item will not be awarded to any of the auction participants and a second phase for the auction during which right and obligation to purchase the item will be awarded to at least one of the auction participants, the first phrase further providing a seed price for the second phase to which the one or more computer systems compare bids from the auction participants;

receiving, at one or more computer systems, a seed price for the first phase of the auction setting a current asking price for the item;

storing, in a database communicatively coupled to the one or more computer systems, the current asking price;

prior to awarding the item to any of the auction participants according to the rules for the auction, posting, with one or more processors associated with the one or more computer systems, the current asking price to the network-based auction location informing the auction participants that bidding on the item below a ceiling established at the current asking price will end the first phase of the auction, and periodically decreasing and posting, with the one or more processors associated with the one or more computer systems, the current asking price to the network-based auction location according to the one or more rules for the auction while no bids from the auction participants are made that satisfy the current asking price;

receiving, at the one or more computer systems, information associated with a first bid offered by a first bidder that satisfies the then current asking price;

receiving, at the one or more computer systems, the first bid offered by the first bidder as a seed price for the second phase of the auction setting the current asking price for the item;

prior to awarding the item to any of the auction participants according to the rules for the auction, posting, with the one or more processors associated with the one or more computer systems, the current asking price to the network-based auction location informing the auction participants that bidding on the item above a floor established at the current asking price will end the second phase of the auction, and periodically increasing and posting, with the one or more processors associated with the one or more computer systems, the current asking price to the network-based auction location while bids from the auction participants are made that satisfy the current asking price; and awarding, with the one or more processors associated with the one or more computer systems, the item to a highest bidder among the first bidder and at least one additional bidder when one or more predetermined criteria specified by the one or more rules signal the end of the second phase of the auction.

2. The method of claim 1, further comprising:

receiving, at the one or more computer systems, information setting a reserve price for the item, the reserve price being that price below which the item will not be sold; and generating, with the one or more processors associated with the one or more computer systems, information stopping the auction at the network-based auction location if the periodic decreasing of the current asking price decreases the current asking price to a level that is at or below the reserve price and no bid is received at the reserve price.

3. The method of claim 1, wherein periodically decreasing and posting, with the one or more processors associated with the one or more computer systems, the current asking price is carried out at a predetermined regular time interval.

4. The method of claim 1, further comprising forwarding, from one or more computers associated with the network-based auction location, information configured for displaying the current asking price on at least one remote computing device coupled to the computer network.

5. The method of claim 1 further comprising accepting each one of one or more increasingly higher successive bids if timely received.

6. The method of claim 1, wherein receiving, at the one or more computer systems, information setting a current asking price for the item includes receiving a current asking price for at least one of a contract, goods, a service, real estate and a legal right.

7. A system for managing an auction for an item at a network-based auction location accessible to auction participants, the system comprising:
at least one processor; and
at least one storage device communicatively coupled to the at least one processor and storing processor-executable instructions that spawn a plurality of processes, the processes including processing logic for:
receiving one or more rules defining when the right and obligation to purchase the item will be awarded, the one or more rules specifying a first phase for the auction the first phase during which the right and obligation to purchase the item will not be awarded to any of the auction participants and a second phase for the auction during which right and obligation to purchase the item will be awarded to at least one of the auction participants, the first phrase further providing a seed price for the second phase to which the processor compares bids from the auction participants;
receiving a seed price for first phase of the auction setting a current asking price for the item;
storing the current asking price in a database;
prior to awarding the item to any of the auction participants according to the rules for the auction,
posting the current asking price to the network-based auction location informing the auction participants that bidding on the item below a ceiling established at the current asking price will end the first phase of the auction, and
periodically decreasing and posting the current asking price to the network-based auction location while no bids from the auction participants are made that satisfy the current asking price;
receiving information associated with a first bid offered by a first bidder that satisfies the then current asking price;
receiving the first bid offered by the first bidder as a seed price for the second phase of the auction setting the current asking price for the item;
prior to awarding the item to any of the auction participants according to the rules for the auction,
posting the current asking price to the network-based auction location informing the auction participants that bidding on the item above a floor established at the current asking price will end the second phase of the auction, and
periodically increasing and posting the current asking price to the network-based auction location while bids from the auction participants are made that satisfy the current asking price; and
awarding the item to a highest bidder among the first bidder and the at least one additional bidder when one or more predetermined criteria specified by the one or more rules signal the end of the second phase of the auction.

8. The system of claim 7, wherein the processes further comprise processing logic for:
receiving information setting a reserve price for the item, the reserve price being that price below which the item will not be sold, and
stopping the auction at the network-based auction location if the periodic decreasing of the current asking price decreases the current asking price to a level that is at or below the reserve price and no bid is received at the reserve price.

9. The system of claim 7, wherein the processing logic for periodically decreasing and posting the current asking price comprises processing logic for decreasing and posting the current asking price at a predetermined regular time interval.

10. The system of claim 7, wherein the processes further comprise processing logic for forwarding information configured for displaying the current asking price on at least one remote computing device coupled to the computer network.

11. The system of claim 7, further comprising processing logic for accepting each one of one or more increasingly higher successive bids if timely received.

12. The system of claim 7, wherein the processing logic for receiving information setting a current asking prices for the item includes processing logic for receiving information setting a current asking price for at least one of a contract, goods, a service, real estate and a legal right.

13. A non-transitory machine-readable medium having data stored thereon representing sequences of instructions which, when executed by one or more computing devices, cause said one or more computing devices to manage an auction for an item at a network-based auction location accessible to auction participants, the non-transitory machine-readable medium comprising:
instructions for receiving one or more rules defining when the right and obligation to purchase the item will be awarded, the one or more rules specifying a first phase for the auction the first phase during which the right and obligation to purchase the item will not be awarded to any of the auction participants and a second phase for the auction during which right and obligation to purchase the item will be awarded to at least one of the auction participants, the first phrase further providing a seed price for the second phase to which the one or more computing devices compare bids from the auction participants;
instructions for receiving a seed price for the first phase of the auction setting a current asking price for the item;
instructions for storing the current asking price in a database;
instructions for, prior to awarding the item to any of the auction participants according to the rules for the auction,
posting the current asking price to the network-based auction location informing the auction participants that bidding on the item below a ceiling established at the current asking price will end the first phase of the auction, and
periodically decreasing and posting the current asking price to the network-based auction location according to the one or more rules for the auction while no bids from the auction participants are made that satisfy the current asking price;
instructions for receiving information associated with a first bid offered by a first bidder that satisfies the then current asking price;
instructions for receiving the first bid offered by the first bidder as a seed price for the second phase of the auction setting the current asking price for the item;

instructions for, prior to awarding the item to any of the auction participants according to the rules for the auction, posting the current asking price to the network-based auction location informing the auction participants that bidding on the item above a floor established at the current asking price will end the second phase of the auction, and periodically increasing and posting, with the one or more processors associated with the one or more computer systems, the current asking price to the network-based auction location while bids from the auction participants are made that satisfy the current asking price; and instructions for awarding the item to a highest bidder among the first bidder and the at least one additional bidder when one or more predetermined criteria specified by the one or more rules signal the end of the second phase of the auction.

14. The non-transitory machine-readable medium of claim 13, further comprising:

instructions for receiving information setting a reserve price for the item, the reserve price being that price below which the item will not be sold, and instructions for stopping the auction at the network-based auction location if the periodic decreasing decreases the current asking price to a level that is at or below the reserve price and no bid is received at the reserve price.

15. The non-transitory machine-readable medium of claim 13, wherein the instructions for periodically decreasing and posting the current asking price comprises instructions for decreasing and posting the current asking price at a predetermined regular time interval.

16. The non-transitory machine-readable medium of claim 13, further comprising instructions for causing the current asking price to be displayed on at least one remote computing device coupled to the computer network.

17. The non-transitory machine-readable medium of claim 14, further comprising instructions for accepting each one of one or more increasingly higher successive bids if timely received.

18. The non-transitory machine-readable medium of claim 13, wherein the instructions for receiving information setting a current asking prices for the item includes instructions for receiving information setting a current asking price for at least one of a contract, goods, a service, real estate and a legal right.

\* \* \* \* \*

UNITED STATES PATENT AND TRADEMARK OFFICE
CERTIFICATE OF CORRECTION

PATENT NO. : 7,987,134 B1  
APPLICATION NO. : 09/965098  
DATED : July 26, 2011  
INVENTOR(S) : Johnson Page 1 of 1

It is certified that error appears in the above-identified patent and that said Letters Patent is hereby corrected as shown below:

Title page, Item (56), under "Other Publications", line 6, delete "IEE" and insert -- IIE --, therefor.

In column 11, line 61, in Claim 1, delete "phrase" and insert -- phase --, therefor.

In column 13, line 26, in Claim 7, delete "phrase" and insert -- phase --, therefor.

In column 14, line 41, in Claim 13, delete "phrase" and insert -- phase --, therefor.

Signed and Sealed this  
Twenty-second Day of November, 2011

David J. Kappos  
*Director of the United States Patent and Trademark Office*